Oct. 4, 1938.  P. HANSON  2,132,210
COMBINE MACHINE
Filed Sept. 21, 1936  3 Sheets-Sheet 1
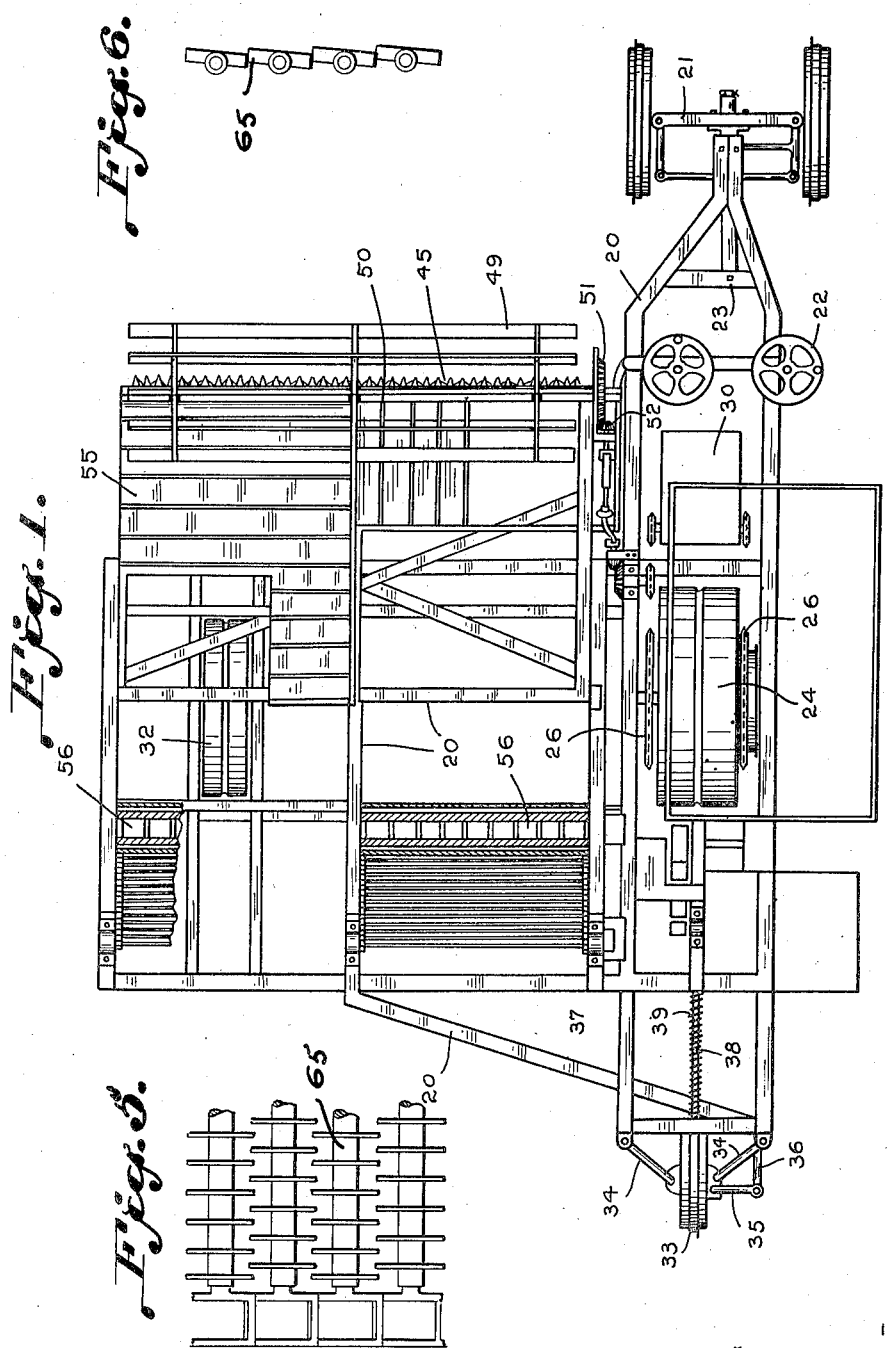
INVENTOR
Peder Hanson
By Ralph Burch
Attorney Oct. 4, 1938.  P. HANSON  2,132,210
COMBINE MACHINE
Filed Sept. 21, 1936  3 Sheets-Sheet 2
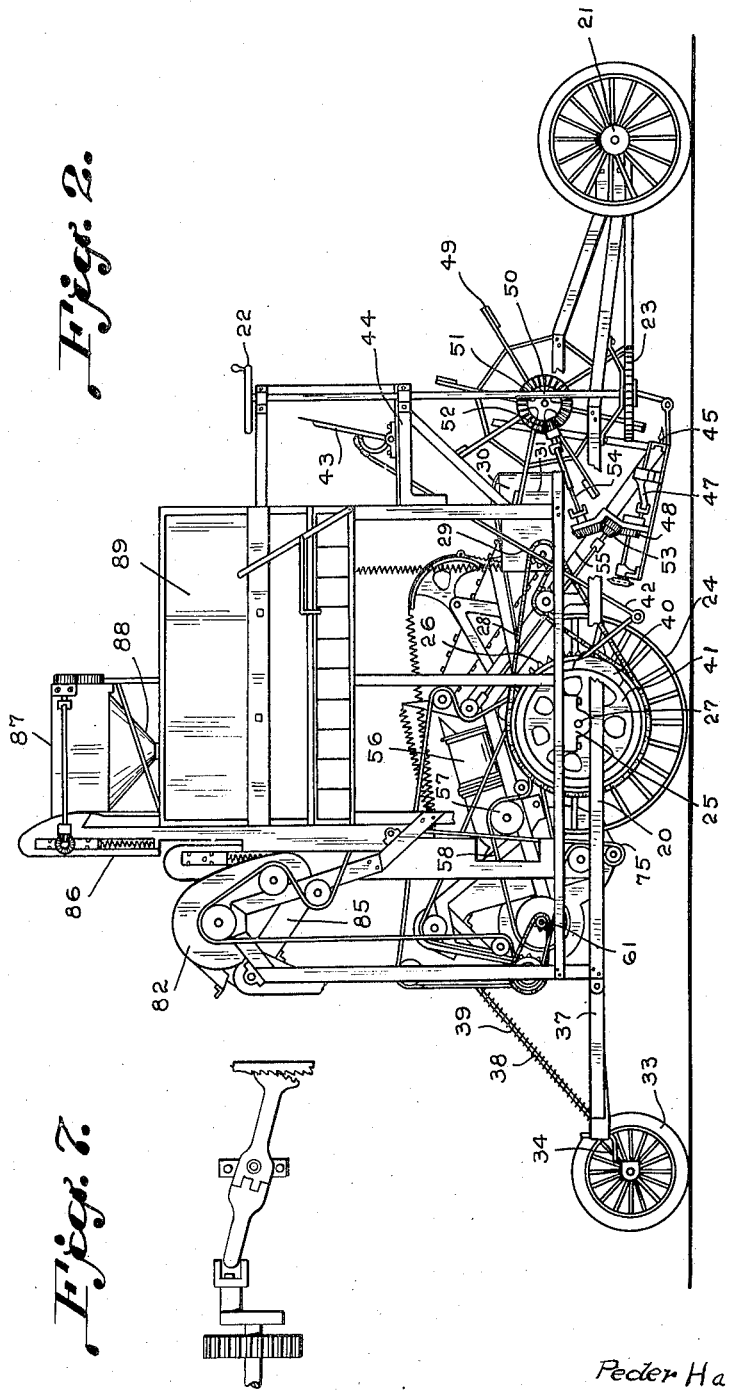
INVENTOR
Peder Hanson
By Ralph Burch
Attorney Oct. 4, 1938.    P. HANSON    2,132,210
COMBINE MACHINE
Filed Sept. 21, 1936    3 Sheets-Sheet 3

INVENTOR
Peder Hanson
By Ralph Burch
Attorney

Patented Oct. 4, 1938

2,132,210

UNITED STATES PATENT OFFICE 2,132,210

COMBINE MACHINE

Peder Hanson, Elrose, Saskatchewan, Canada

Application September 21, 1936, Serial No. 101,829
In Canada June 22, 1936

13 Claims. (Cl. 56—20)

This invention relates to improvements in a combine harvester machine including cutting, threshing and cleaning mechanism, its primary object being to provide a compact self contained machine for the purpose set forth.

A further object of the invention is to simplify the construction and operation of the machine by the elimination of certain elements common to most combine harvesters now in use.

A still further object of the invention is to design and construct a harvesting machine for the combined purposes of cutting, threshing and cleaning grain, said machine having constructed therewith motive power for the propulsion of the machine and also for the operation of the various elements included therein.

With these and other objects in view that may appear while the description proceeds the invention consists in the novel construction and arrangement of parts as hereinafter more specifically set forth, claimed and shown in the accompanying drawings forming part of this application and in which:—

Fig. 1 is a plan view of my improved combine harvester machine.

Fig. 2 is a side elevation of the same.

Fig. 5 is a plan view of the straw carrier.

Fig. 6 is an end elevation of the same.

Fig. 7 is a detailed view of the pitman.

Figure 4:
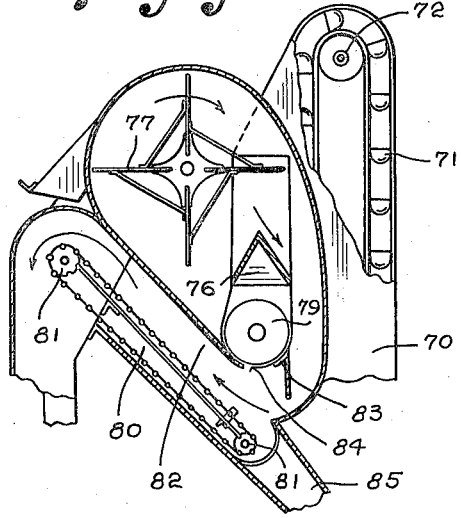
Fig. 4 is a sectional elevation of the recleaner.
Figure 3:
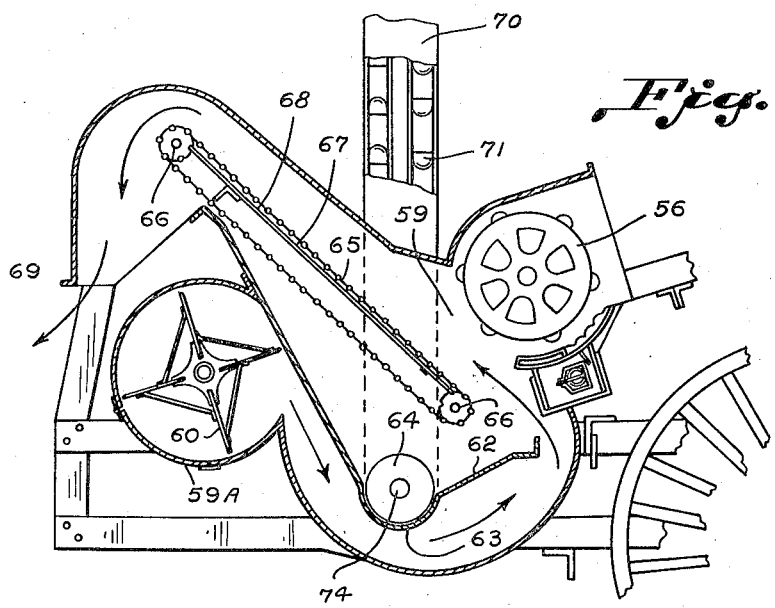
Fig. 3 is a sectional elevation showing the cylinder straw carrier and the fan mechanism.

Referring more in detail to the drawings in which similar reference characters designate corresponding parts throughout the several views it will be seen the invention comprises a frame 20 of suitable channel and angle iron members braced to form a rigid supporting structure. A pivoted truck 21 is provided at the front having a steering wheel 22 and steering mechanism 23 connected thereto to manipulate the said truck to steer or guide the same when in motion. A large drive wheel 24 is positioned centrally of the length of the machine and is journalled in bearings 25 secured to the frame 20. Said wheel is driven by means of sprocket wheels 26 secured on the wheel axle 27 and drive chains 28 engaging the same and corresponding sprocket pinion 29 mounted on an engine 30 which forms the motive power of the machine. Said engine is preferably of the internal combustion type and is mounted on the frame 20 and enclosed with a suitable hood 31. A support wheel 32 is provided under the machine and is positioned laterally of the drive wheel, said wheel is mounted freely in its journals to give freedom for steering. The rear support wheel 33 is pivotally mounted on a pair of brackets 34 and is connected to the steering mechanism by an arm 35 and connecting rod 36 in a manner to be turned in correspondence with front truck and in the opposite direction thereto to aid in steering the machine. The rear wheel support 37 is yieldably connected to the frame by a rod 38 slidable therebetween having a helical spring 39 thereon arranged in a manner to exert a downward thrust on wheel and therefore an upward thrust on the machine thereby maintaining the wheel in constant contact with the ground when traveling over an uneven surface without causing undue rocking to the machine structure. A brake shoe 40 is arranged to contact a brake drum 41 attached to the drive wheel 24. Said brake shoe is actuated by connecting rods 42 and a brake lever 43 positioned on a platform 44 upon which the operator stands, the frame support wheels and steering mechanism constituting a carriage for the combine harvester mechanism.

The harvesting mechanism comprises cutter means 45 actuated by pitman 46 which is in turn operated by a pivoted shaft 46a connected by a swivel connection 47 on a shaft 47a by a sprocket 48. The standing grain is impelled toward the cutters by the reel 49 which is rotatably mounted on a lateral shaft 50 and driven by a bevel gear 51 and pinion 52 which are in turn driven from the motive power of the machine by gears 53 and connecting rods 54.

After being cut, the grain falls onto the inclined canvas conveyors 55 arranged in parallel relation and is carried thereby to the cylinder 56 where the grain is separated from the chaff and straw. Said cylinder is mounted laterally in the frame and extends across the full width of the swath cut by the mower mechanism. The cylinder is rotated by a pulley 57 fixed on the axle thereof, said pulley being actuated by a belt 58 which is in turn connected to the motive power of the machine.

From the cylinder the straw, grain and chaff falls into the casing 59. A fan 60 is rotatably mounted in said casing and is rotated by the fan pulley 61 and belt 58 at a high speed in order to create a strong current of air which is admitted to the casing by an adjustable door 59a and in the direction of the arrows. It will be seen the air current blows the straw and chaff upwards while the heavier grain falls down onto the tray 62 and from thence into a semicircular trough 63 from where it is impelled laterally by means of a rotating auger 64 to an elevator 70 and raised to the recleaner mechanism to be later described. The straw and chaff is also carried by the endless conveyor 65 which rotates over the sprockets 66. A metal plate 67 is provided having a plurality of slots 68 therein to permit any stray grain to fall through to the channel 63. The straw and chaff is then blown out of the outlet 69 and disposed of as found necessary.

As previously stated the grain is carried from the auger 64 to the recleaner by an elevator 70 which is of the endless chain type having grain carrying receptacles 71 thereon and mounted on sprockets 72. Drive for the said auger and elevator is obtained by a pulley 73 on the auger axle 74 and the belt 75 which transmits the power from the motive power unit of the machine. When the grain is tipped out of the receptacles it falls into a chute 76 from whence it drops out into the recleaner.

The recleaner comprises a rotatable fan 77 mounted in the recleaner casing 78. Said fan is mounted above an auger 79 which is also rotatably mounted laterally in the casing and directly below the chute 76. As the grain falls out from the chute to the auger the air current blows the chaff or small seeds out from the wheat. The said chaff, etc., is carried out in the direction of the arrows and a small endless chain 80 is mounted on sprockets 81 in the casing 82 to assist in carrying the same out. The wheat falls into a semi-circular catch trough 83 in which the auger 79 rotates, said trough having an elongated slot 84 in the end thereof through which the wheat falls as it is carried thereto by the auger 79. It then passes through a chute 85 to another elevator 86 which is constructed and operated similar to the elevator 70. This elevator carries the grain into a screen drum 87 from whence it falls through a hopper 88 into a storage bin 89.

It is believed that the construction and advantages of the structure shown may be apparent from the foregoing paragraphs, taken in conjunction with the accompanying drawings without further detailed description.

While the preferred embodiment of the invention has been disclosed it is understood that minor changes in the details of construction, combination and arrangement of co-operating elements may be resorted to within the scope of what is claimed without departing from the spirit of the invention.

I claim:

1. A thresher mechanism for combine machines comprising a casing having an inlet and outlet at opposite ends, a separator cylinder rotatably mounted in the inlet of said casing, a partition extending diagonally of said casing between the inlet and outlet of said casing, a transverse trough formed in the lower end of said partition, a tray extending upwardly from said trough beneath said cylinder, a blower fan mounted beneath said partition for directing a blast of air around said tray, a screw conveyor mounted in said trough, and an endless conveyor mounted above said partition and extending above the upper end thereof adjacent the outlet of said casing.

2. A thresher mechanism for combine machines comprising a casing having an inlet and outlet at opposite ends, a separator cylinder rotatably mounted in the inlet of said casing, a partition disposed diagonally of the casing between the inlet and outlet of said casing, a transverse trough formed in the lower end of said partition, a tray extending upwardly from said trough adapted to receive the grain discharged from said cylinder and convey the grain to said trough, a screw conveyor mounted in said trough, an inclined endless conveyor mounted above said partition having its lower end disposed adjacent said cylinder and its upper end adjacent the outlet of said casing, and a blower fan mounted beneath said partition for directing a blast of air around said tray and through the stream of grain whereby the straw and chaff is separated from the grain and deposited on said endless conveyor.

3. A thresher mechanism for combine machines comprising a casing having an inlet and outlet at opposite ends, a separator cylinder mounted in the inlet of said casing, a tray mounted below said cylinder to receive the grain discharged therefrom, a trough formed in said tray extending transversely of said casing, a screw conveyor mounted in said trough, an endless conveyor disposed in said casing having its lower end disposed adjacent said cylinder and its upper end adjacent the outlet of said casing, and means for directing a blast of air around said tray and towards the outlet of the casing for separating the chaff and straw from the grain and depositing it on the endless conveyor.

4. In a combine harvester machine comprising a frame mounted on support and drive wheels constituting a carriage having front and rear steering wheels controlled by a common actuating mechanism, grain cutting means mounted on the front of the carriage, a separator cylinder rotatably mounted transversely on said carriage, conveyor means carrying the grain from said cutting means to said cylinder, cleaner means associated with said cylinder and means conveying the grain therefrom to a storage bin carried on said carriage.

5. In a combine harvester machine comprising a frame mounted on a main drive wheel and a laterally disposed support wheel constituting a carriage, a pivoted truck supporting the front of the carriage and forming steering means therefor, a rear support wheel pivotally mounted on a pair of pivot brackets, means connecting the same to the steering mechanism of the front pivoted truck causing the same to turn in correspondence therewith, grain cutting means on the front of the carriage, a separator cylinder rotatably mounted transverse on the carriage, conveyor means carrying the grain from the said cutting means to said cylinder, cleaner means associated with said cylinder and means conveying the grain therefrom to a storage bin on said carriage.

6. In a combine harvester machine comprising a frame mounted on a main drive wheel and a laterally disposed support wheel constituting a carriage, a pivoted truck supporting the front of the carriage and forming steering means therefor, a rear support wheel pivotally mounted on a pair of pivot brackets, means connecting the same to the steering mechanism of the front pivoted truck causing the same to turn in correspondence therewith, said rear support wheel and brackets mounted on a vertically yieldable frame member, said frame member being actuated by a helical spring, grain cutting and threshing means mounted on the carriage and power means operating the same.

7. In a combine harvester machine comprising a carriage having propulsion means therefor, grain cutting means mounted on the front thereof, a rotatable separator cylinder mounted laterally on said frame, grain conveyor means from said cutting means to said cylinder, a casing adjacent said cylinder, a fan rotatably mounted therein, and means admitting air thereto and an outlet therefor, a tray positioned laterally in said casing and extending partially below the cylinder, a semi-circular trough formed in said tray, a rotatable auger operating therein, and elevator means associated therewith.

8. In a combine harvester machine comprising a carriage having propulsion means therefor, grain cutting means mounted on the front thereof, a rotatable separator cylinder mounted laterally on said frame, grain conveyor means from said cutting means to said cylinder, a casing adjacent said cylinder, a fan rotatably mounted therein, and means admitting air thereto and an outlet therefor, a tray positioned laterally in said casing and extending partially below the cylinder, a semi-circular trough formed in said tray, a rotatable auger operating therein, straw and chaff conveyor means rotatably mounted in said casing and angularly disposed therein, the lower end thereof being partially below the separating cylinder and the upper end being above the casing outlet, and elevator means conveying the separated grain from the casing.

9. In a combine harvester machine comprising a carriage having propulsion means therefor, grain cutting means mounted on the front thereof, a rotatable separator cylinder mounted laterally on said frame, grain conveyor means from said cutting means to said cylinder, a casing adjacent said cylinder, a fan rotatably mounted therein, and means admitting air thereto and an outlet therefor, a tray positioned laterally in said casing and extending partially below the cylinder, a semi-circular trough formed in said tray, a rotatable auger operating therein, straw and chaff conveyor means rotatably mounted in said casing and angularly disposed therein, the lower end thereof being partially below the separating cylinder and the upper end being above the casing outlet, grain recleaner means positioned above the separator mechanism and elevator means conveying the grain from the said separator mechanism to the said recleaner means.

10. In a combine harvester machine comprising a carriage having propulsion means therefor, grain cutting means mounted on the front thereof, a rotatable separator cylinder mounted laterally on said frame, grain conveyor means from said cutting means to said cylinder, a casing adjacent said cylinder, a fan rotatably mounted therein, and means admitting air thereto and an outlet therefor, a tray positioned laterally in said casing and extending partially below the cylinder, a semi-circular trough formed in said tray, a rotatable auger operating therein, straw and chaff conveyor means rotatably mounted in said casing and angularly disposed therein, the lower end thereof being partially below the separating cylinder and the upper end being above the casing outlet, a grain re-cleaner casing mounted above the separator casing, an endless chain elevator carrying the grain from the latter to the former, a delivery chute from said elevator means to the interior of said casing, a rotatable auger mounted laterally in the casing below the said chute, a rotatable fan mounted laterally in said casing above said chute and said auger, an angularly disposed rotatable conveyor mounted laterally in the said casing carrying the refuse from the bottom thereof to the exit and means conveying the recleaned grain to a storage bin.

11. In a combine harvester machine comprising a carriage having propulsion means therefor, grain cutting means mounted on the front thereof, a rotatable separator cylinder mounted laterally on said frame, grain conveyor means from said cutting means to said cylinder, a casing adjacent said cylinder, a fan rotatably mounted therein, and means admitting air thereto and an outlet therefor, a tray positioned laterally in said casing and extending partially below the cylinder, a semi-circular trough formed in said tray, a rotatable auger operating therein, straw and chaff conveyor means rotatably mounted in said casing and angularly disposed therein, the lower end thereof being partially below the separating cylinder and the upper end being above the casing outlet, a grain re-cleaner casing mounted above the separator casing, an endless chain elevator carrying the grain from the latter to the former, a delivery chute from said elevator means to the interior of said casing, a rotatable auger mounted laterally in the casing below the said chute, a rotatable fan mounted laterally in said casing above said chute and said auger, an angularly disposed rotatable conveyor mounted laterally in the said casing carrying the refuse from the bottom thereof to the exit, a semi-circular catch trough below said chute wherein said auger rotates, exit means at one end of said trough and elevator means associated therewith to convey the re-cleaned grain to a storage bin.

12. In a combine harvester machine comprising a carriage having propulsion means therefor, a grain cutting means mounted on the front thereof, a rotatable separator cylinder mounted laterally on said frame, grain conveyor means from said cutting means to said cylinder, a casing adjacent said cylinder, a fan rotatably mounted therein, and means admitting air thereto and an outlet therefor, a tray positioned laterally in said casing and extending partially below the cylinder, a semi-circular trough formed in said tray, a rotatable auger operating therein, straw and chaff conveyor means rotatably mounted in said casing and angularly disposed therein, the lower end thereof being partially below the separating cylinder and the upper end being above the casing outlet, a grain re-cleaner casing mounted above the separator casing, an endless chain elevator carrying the grain from the latter to the former, a delivery chute from said elevator means to the interior of said casing, a rotatable auger mounted laterally in the casing below the said chute, a rotatable fan mounted laterally in said casing above said chute and said auger, an angularly disposed rotatable conveyor mounted laterally in the said casing carrying the refuse from the bottom thereof to the exit, a semi-circular catch trough below said chute wherein said auger rotates, exit means at one end of said trough, a screen drum, elevator means conveying the re-cleaned grain from the re-cleaner thereto, a hopper below said drum and a storage bin associated therewith.

13. In a combine harvester machine comprising a carriage having propulsion means therefor, grain cutting means mounted on the front thereof, a rotatable separator cylinder mounted laterally on said frame, grain conveyor means from said cutting means to said cylinder, a casing adjacent said cylinder, a fan rotatably mounted therein and means admitting air thereto and an outlet therefor, a tray positioned laterally in said casing and extending partially below the cylinder, a semi-circular trough formed in said tray, a rotatable auger operating therein, straw and chaff conveyor means rotatably mounted in said casing and angularly disposed therein, the lower end thereof being partially below the separating cylinder and the upper end being above the casing outlet, a grain re-cleaner casing mounted above the separator casing, an endless chain elevator carrying the grain from the latter to the former, a delivery chute from said elevator means to the interior of said casing, a rotatable auger mounted laterally in the casing below the said chute, a rotatable fan mounted laterally in said casing above said chute and said auger, an angularly disposed rotatable conveyor mounted laterally in the said casing carrying the refuse from the bottom thereof to the exit, a semi-circular catch trough below said chute wherein said auger rotates, exit means at one end of said trough, a screen drum, elevator means conveying the re-cleaned grain from the re-cleaner thereto, a hopper below said drum and a storage bin associated therewith, and power means carried on the said carriage operating the various elements of the mechanism, substantially set forth.

PEDER HANSON.